United States Patent [19]
Paddock et al.

[11] 3,945,489
[45] Mar. 23, 1976

[54] ARTICLE-ORIENTING CONVEYOR

[75] Inventors: Paul F. Paddock, Riverside; Jerry W. Cramer, Upland, both of Calif.

[73] Assignee: Sunkist Growers, Inc., Sherman Oaks, Calif.

[22] Filed: Sept. 28, 1973

[21] Appl. No.: 401,886

[52] U.S. Cl................................ 198/266; 198/254
[51] Int. Cl.².......................................... B65G 47/24
[58] Field of Search..... 198/33 AA, 33 R, 136, 151, 198/131, 254, 258, 259, 260, 266; 186/27, 29

[56] References Cited
UNITED STATES PATENTS

| | | | |
|---|---|---|---|
| 675,905 | 6/1901 | Pittman............................ | 198/151 X |
| 2,853,108 | 9/1958 | Hait.................................. | 198/258 |
| 2,907,440 | 10/1959 | Hait.................................. | 198/33 AA |
| 3,120,889 | 2/1964 | Willsey.............................. | 198/254 |
| 3,137,383 | 6/1964 | Chamberlin........................ | 198/25 X |
| 3,587,829 | 6/1971 | Sorensen............................ | 198/131 |
| 3,738,474 | 6/1973 | Ellis.................................. | 198/33 AA |

*Primary Examiner*—Evon C. Blunk
*Assistant Examiner*—Douglas D. Watts
*Attorney, Agent, or Firm*—Paul A. Weilein

[57] ABSTRACT

A conveyor having a single row of receptacles to seat individual fruit of a corresponding row of citrus fruit moves the fruit in succession past a station where it is required that the major axis of each fruit, i.e., the axis through the stem and blossom ends of the fruit be parallel to the direction of travel of the fruit. In each receptacle the individual fruit rests on a pair of parallel power-actuated spool-shaped rollers the axes of which are parallel to the direction of travel of the receptacles, which rollers spin the fruit to cause the major axes of the fruit to be oriented parallel to the direction of travel.

35 Claims, 8 Drawing Figures

ARTICLE-ORIENTING CONVEYOR

BACKGROUND OF THE INVENTION

The invention relates to the handling of ellipsoidal objects which may be manufactured objects or may be agricultural produce and is directed to the problem of moving the ellipsoidal objects in rapid succession to or past a given station with the major axes of the elongated objects at a selected orientation relative to the direction of travel of the fruit. For example, the orientation may be parallel to the direction of travel or may be perpendicular. The initial practice of the invention pertains to the handling of runs of oranges or lemons in a fruit packing plant where it is required that the major axes of the fruit be oriented in the direction of travel.

SUMMARY OF THE INVENTION

To achieve an economical production rate, the first problem to be solved is to provide a high speed apparatus to take the fruit from a bulk supply and to feed the fruit at random orientation to a single row conveyor that travels at a rapid rate. For example, the desired rate may be ten fruit per second, which means 600 fruit per minute or 36,000 fruit per hour. This initial problem is solved by an apparatus disclosed in a copending application of Paul F. Paddock and Jerry W. Cramer, Ser. No. 295,915, filed Oct. 10, 1972.

The second problem, which is the problem solved by the present invention, is to change the random orientation of the major axes of the travelling fruit to orientation parallel to the direction of travel as the travelling fruit reaches an inspection station. The purpose of the inspection station may be to check the fruit for defects and/or to classify the fruit on some other basis.

Accordingly, one object of the invention is to provide a series of receptacles for the fruit in a single row conveyor wherein each fruit is supported at four points by parallel rollers which rotate on horizontal axes parallel to the direction of travel to spin the travelling fruit rapidly to cause the major axes of the fruit to assume an orientation that is parallel to the direction of travel before the fruit reaches the inspection station.

In the initial embodiment of the invention the conveyor is a chain conveyor with a single row of interconnected receptacles for the individual fruit and each fruit seats on a pair of parallel spool-shaped rollers that have their axes oriented in the direction of travel of the receptacles. Each of the two spool-shaped rollers contacts the fruit at two spaced points of the fruit and therefore a spool-shaped roller is in effect equivalent to a pair of spaced coaxial rollers.

The means for driving the pair of longitudinally aligned spool-shaped rollers comprises gearing which includes a pair of driven gears unitary with the two spool-shaped rollers respectively and a pair of drive gears which mesh with the driven gears respectively and which rotate in planes that are parallel with the direction of travel of the receptacles. The two drive gears mesh respectively with corresponding sprocket chains which extend along the path of travel of the receptacles. The invention teaches that the two longitudinal sprocket chains may be stationary so that the rotation of the spool-shaped rollers is determined solely by the rate of travel of the receptacles, but in the preferred practices of the invention the two parallel sprocket chains are power-actuated so that the rate of rotation of the two spool-like rollers is the resultant or differential between the travel of the receptacles and the rate of longitudinal movement of the two sprocket chains. Thus, actuation of the two longitudinal sprocket chains makes it possible to rotate the fruit-orienting rollers on the receptacles at any desired rate independently of the rate of travel of the receptacles.

A feature of the invention is that the spacing of the spool-shaped rollers on the receptacles is adjustable to handle fruit of different sizes with corresponding adjustment in the axial positions of the drive gears of each receptacle and corresponding adjustment in the spacing of the two longitudinal sprocket chains that engage the drive gears.

A further feature of the invention is that the successive receptacles of the conveyor releasably hook together in a pivotal manner and a receptacle may be removed for replacement by simply lifting one end of the receptacle and slightly retracting the tilted receptacle longitudinally. With the receptacles releasably mounted in this manner for quick replacement, two sets of receptacles may be used interchangeably with the two sets adjusted for two different sizes of fruit. Thus, the "down" time for changing over from a run of one size of fruit to a run of another size of fruit is reduced to the minimum because one set of receptacles is simply substituted for another set without taking time to adjust the spacing of the two spool-shaped rollers on each receptacle.

The various features and advantages of the invention may be understood from the following detailed description and the accompanying drawings.

BRIEF DESCRIPTION OF THE DRAWINGS

In the drawings, which are to be regarded as merely illustrative:

FIG. 5 is an enlarged fragmentary side view of the conveyor indicating how a receptacle may be released for removal and replacement by tilting one end of the receptacle upward;

FIG. 6 is a view similar to FIG. 3 showing how a receptacle may be assembled for greater spacing between the two spool-shaped rollers to handle a run of fruit of larger size;

FIG. 7 is a transverse section of the receptacle shown in FIG. 6; and

FIG. 8 is a fragmentary sectional view taken along the line 8—8 of FIG. 2 showing the structure that permits varying the spacing beween the two longitudinal sprocket chains that engage the drive gears of the receptacles.

DESCRIPTION OF THE PREFERRED EMBODIMENT OF THE INVENTION

Figure 1:
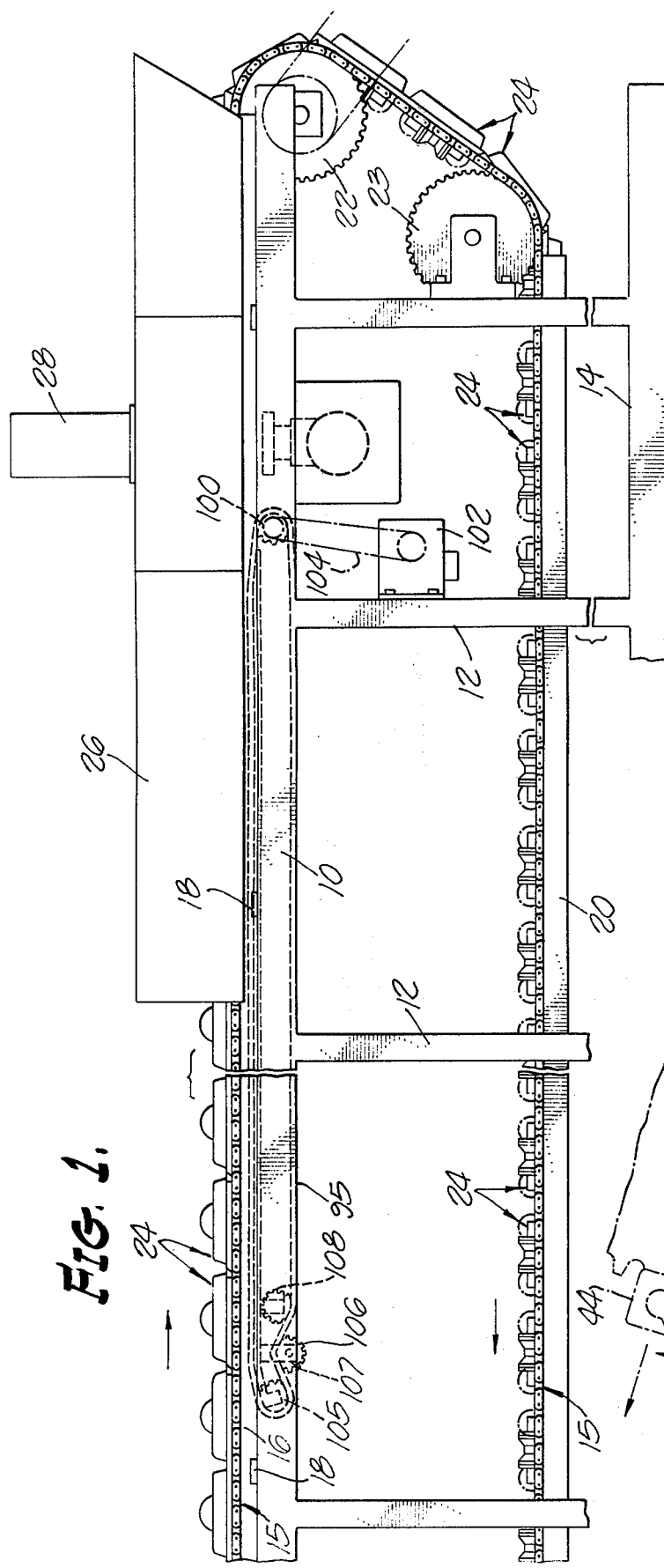
FIG. 1 is a fragmentary side elevational view of the initial embodiment of the conveyor.
Figure 4:
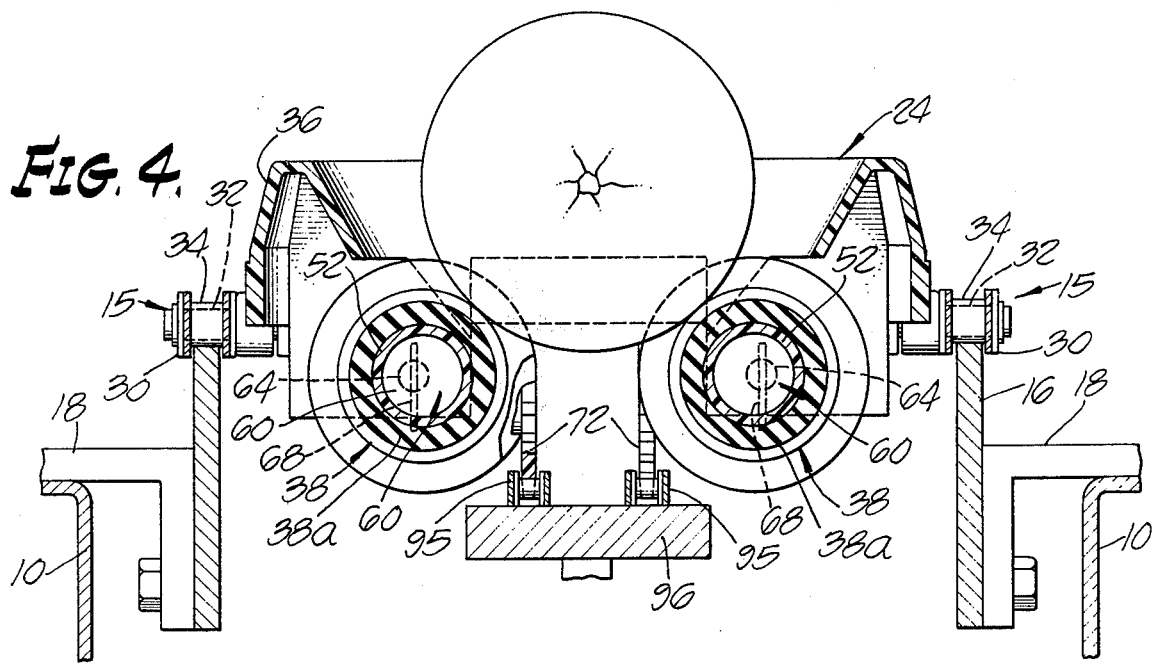
FIG. 4 is a transverse vertical section taken as indicated by the line 4—4 of FIG. 2.

Referring first to FIG. 1, the illustrated embodiment of the invention has a frame which includes a pair of upper opposite longitudinal side members 10 supported by legs 12 which extend upward from a base 14. A conveyor having a pair of spaced parallel continuous conveyor sprocket chains 15 has an upper run where the conveyor sprocket chains ride on a pair of rails 16 which, as indicated in FIG. 4, are supported on the side frame members 10 by spaced angle iron brackets 18. In like manner, the lower return run of the pair of conveyor sprocket chains rests on similar rails 20 shown in FIGS. 1 and 5 which are suitably supported by the legs 12 of the conveyor frame. At each end of the conveyor the pair of conveyor sprocket chains 15 pass over upper and lower pairs of conveyor sprockets 22, 23 and in a well known manner one of these four pairs of conveyor sprockets is suitably power actuated.

Operatively connected to the pair of conveyor sprocket chains 15 is a travelling row of receptacles 24 for the individual citrus fruit which conveys the fruit in rapid succession through a longitudinal housing 26 having an inspection station 28 where, for example, the individual fruit may be successively X-rayed. The function of the receptacles 24 is not only to move the individual fruit successively past the inspection station, but also to insure that the major axes of the elongated fruit are oriented parallel to the direction of travel of the conveyor. The length of each receptacle 24 is approximately 7½ inches and since the objective in the initial embodiment of the invention is to process ten fruit per second or 36,000 per hour, the rate of travel of the conveyor is 75 inches or 6.25 feet per second.

Figure 2:
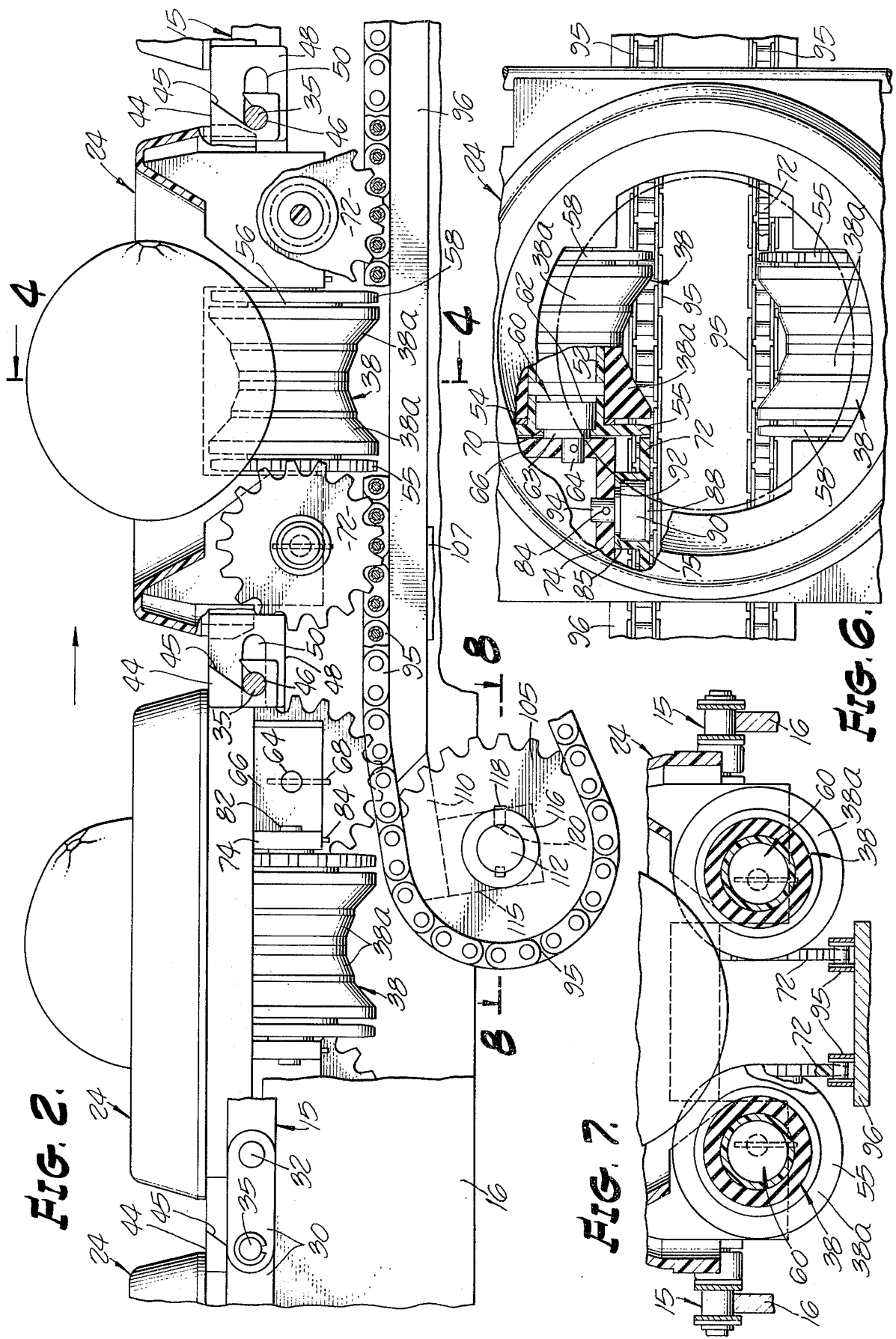
FIG. 2 is a greatly enlarged fragmentary view of the conveyor with portions of the structure broken away.
Figure 3:
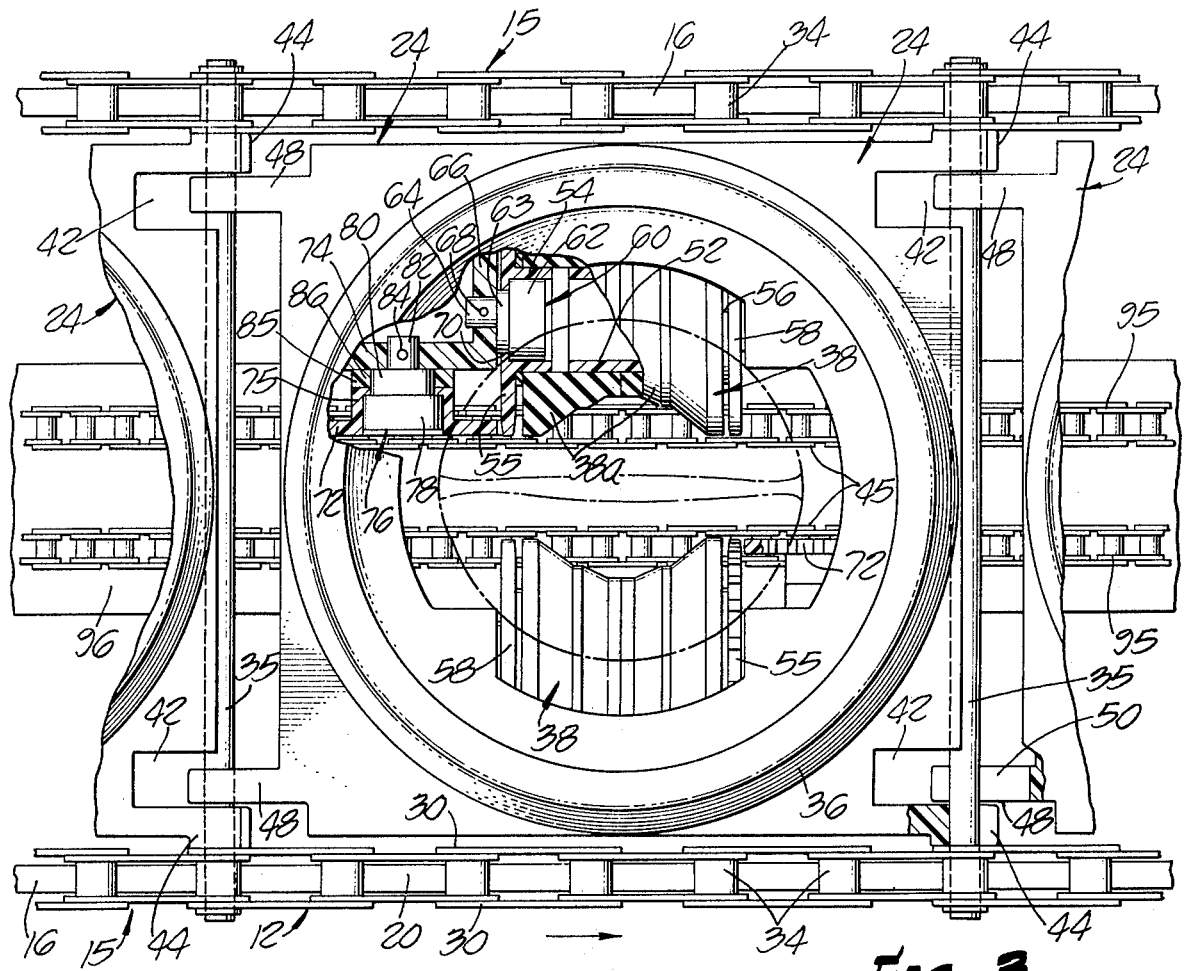
FIG. 3 is an enlarged fragmentary plan view of the conveyor with portions of the structure broken away.

Referring to FIGS. 2 and 3, each of the two conveyor sprocket chains 15 is of conventional construction comprising longitudinal links 30 interconnected by pins 32 which are embraced by rotatable sleeves 34. Transverse rods 35 spaced 7½ inches apart are substituted for pins 32 of the conveyor sprocket chains with the opposite ends of the transverse rods carried by the two conveyor sprocket chains respectively and with the leading ends of the receptacles 24 pivotally connected to the transverse rods respectively.

Each of the receptacles 24, which may be made of nylon, is formed with a bowl 36 which is open at the bottom to permit a pair of parallel spool-shaped rollers 38 to support the individual fruit and to spin the individual fruit to cause each fruit to seek an orientation with its major axis parallel to the direction of travel of the conveyor. Each of the two spool-shaped rollers 38 is equivalent to two coaxial rollers and in the construction shown comprises two abutting tubular soft rubber roller elements 38a, each of which makes supporting contact with one point of the individual travelling fruit.

As indicated in FIG. 3, the leading end of each receptacle 24 has two end slots 42 near its opposite sides respectively which form corresponding leading longitudinal tongues 44 at the opposite sides of the receptacle and, as shown in FIG. 2, each of the leading tongues 44 is hook-shaped with an upwardly extending entrance slot 45 to receive the corresponding transverse rod 35. The entrance slot extends upward from a seat 46 which engages the transverse rod from below. As shown in FIG. 3 the trailing end of each receptacle 24 has a pair of longitudinal trailing tongues 48 which loosely extend into the corresponding forward slots 42 of the next succeeding receptacle and each of these trailing tongues in formed with a longitudinal slot 50 which slidably straddles the corresponding transverse rod 35 as may be seen in FIG. 2. The slots 50 in the trailing tongues 48 permit sufficient longitudinal relative movement between the receptacles to permit the receptacles to change direction as required to pass over the various conveyor sprockets 22, 23.

When the receptacles 24 traverse the lower return run of the conveyor the receptacles are upside down as shown in FIG. 1 and at this time the entrance slots 45 of the leading tongues 44 of the receptacles incline downward instead of upward, as may be seen in FIG. 5, to permit the leading end of a receptacle to be disengaged from the corresponding transverse rod 35 by simply lifting the leading end of the receptacle upward as indicated by the tilted position shown in phantom in FIG. 5. With the leading end of the receptacle tilted upward in this manner it is a simple matter to move the tilted receptacle slightly longitudinally forward to cause the slots 50 of the trailing tongues 48 of the receptacle to slide out of engagement with the associated transverse rod 35. It is apparent that receptacles constructed to handle a run of one size of fruit may be quickly and conveniently replaced by an alternate set of receptacles that are constructed to handle a run of fruit of different size.

As shown in FIGS. 2 and 3, each pair of the spool-shaped rollers 38 is positioned with its parallel axes oriented longitudinally of the direction of travel for corresponding orientation of the major axes of the elongated fruit. The receptacles shown in FIGS. 2, 3 and 4 are assembled with relatively small spacing between the axes of the two spool-shaped rollers 38 for handling relatively small fruit and the receptacles shown in FIG. 6 and 7 are assembled with greater spacing between the axes of the two spool-shaped rollers for handling fruit of larger size. A feature of the invention is that a receptacle 24 may be assembled to handle fruit of either size. Thus, it is a simple matter to provide two interchangeable sets of receptacles 24 to handle respectively runs of two different sizes of fruit.

Each of the two halves of a spool-shaped roller 38, i.e., each of the soft rubber roller elements 38a is tubular and has the general shape of a truncated cone of stepped configuration. The two roller elements are positioned coaxially with their smaller ends in mutual abutment, as may be seen in FIGS. 2 and 3. Referring to FIG. 3, each pair of abutting roller elements 38a telescope at their inner ends over a common rigid tubular core 52. The opposite larger end of one of the roller elements 38a telescopes over the tubular hub 54 of a nylon driven sprocket 55 while the opposite larger end of the other roller element 38a telescopes over a similar tubular hub 56 of a nylon disc 58 at the other end of the spool-shaped roller.

Each of the two tubular hubs 54, 56 of the drive sprocket 55 and the nylon disc 58 respectively is mounted on a corresponding eccentric axle 60. Each of the eccentric axles 60 is of stepped configuration, being formed with an enlarged portion 62 of circular configuration, an intermediate portion 63 of circular configuration concentric to the enlarged portion 62, and an outer end portion 64 of reduced diameter that is eccentric to the two portions 62 and 63. Each of the reduced end portions 64 of the two eccentric axles 60 is mounted in a bore of an adjacent wall 66 of the receptacle and is immobilized therein by a suitable metal dowel 68.

Each of the tubular hubs 54, 56 of the drive sprocket 55 and the nylon disc 58 respectively is rotatably mounted on the enlarged portion 62 of the corresponding eccentric axle 60 with an inner radial flange 70 of the hub confined between the enlarged portion 62 of the axle and the adjacent wall 66.

In FIGS. 3 and 4 the two eccentric axles 60 are turned inwardly towards each other for minimum spacing of the two spool-shaped rollers 38 and it is apparent that rotation of each of the eccentric axles 180° would result in maximum spacing of the two spool-shaped rollers.

Each of the two nylon driven sprockets 55 of a receptacle 24 is driven by a corresponding nylon drive sprocket 72 which is positioned perpendicularly of the driven sprocket and therefore rotates in a plane that is parallel with the direction of travel of the receptacle. If, as in FIGS. 3 and 4, the two spool-shaped rollers 38 of a receptacle are at minimum spacing from each other, each of the two drive sprockets 72 of the receptacle is mounted on an adjacent wall 74 of the receptacle in the manner shown in FIG. 3 where the tubular hub 75 of a drive sprocket 72 is rotatable on a fixed axle 76. The fixed axle 76 is of stepped configuration having an enlarged portion 78, an intermediate portion 80 of lesser diameter, and a concentric end portion 82 of reduced diameter that is mounted in a bore in the wall 74 and is immobilized therein by a metal dowel 84. As shown in FIG. 3 the hub 75 of the drive sprocket 72 is formed with an inner radial flange 85 which is confined between the intermediate portion 80 of the spindle and a spacer collar 86 that backs against the wall 74.

FIGS. 6 and 7 show how a receptacle 24 may be assembled with maximum spacing between the two spool-shaped rollers 38 of the receptacles for handling fruit of relatively large size For this purpose the previously mentioned eccentric axles 60 are turned away from each other as shown in FIG. 7 instead of being turned towards each other as shown in FIG. 4. The rotation of the eccentric axles 60 180° from the positions shown in FIGS. 3 and 4 shifts the driven sprockets 55 of the spool-shaped rollers outward relative to the longitudinal center line of the receptacle and accordingly the two cooperating drive sprockets 72 must be shifted axially outward to mesh with the driven sprockets 55 at their new positions. For this purpose shorter axles 88 are substituted for the previously described relatively long axles 76 and the spacer collars 86 are omitted.

As shown in FIG. 6 each of the two shorter axles 88 for a drive sprocket 72 has an enlarged circular portion 90, an intermediate circular portion 92 of lesser diameter, and a concentric reduced end portion 94 which is mounted in a bore in the wall 74 and is immobilized by a metal dowel 84. The tubular hub 75 of the drive sprocket 72 embraces the enlarged portion 90 of the short spindle with the previously mentioned inner radial flange 85 of the drive sprocket confined between the enlarged portion 90 of the axle and the adjacent wall 74.

For the purpose of actuating the pairs of drive sprockets 72 of the travelling receptacles 24, upper runs of a pair of spaced parallel auxiliary sprocket chains 95 extend under the upper run of the travelling receptacles 24 to engage and actuate the two drive sprockets 72 respectively of each travelling receptacle thereby to actuate the spool-shaped rollers 38 of the receptacles. The upper runs of the two auxiliary sprocket chains 95 travel along a longitudinal shelf 96 and are free to slide laterally on the shelf to follow minor lateral deviations of the travelling receptacles. As indicated by dotted lines in FIG. 1, the pair of auxiliary sprocket chains 95 pass around a pair of drive sprockets 100 which are actuated by a variable speed motor 102 by means of a drive chain 104. At the beginning of their upper runs the auxiliary sprocket chains pass around a pair of idler sprockets 105. The two auxiliary sprocket chains may be adjustably tightened by means of a pair of adjustable sprockets 106 on a bracket 107 in cooperation with the idler sprockets 105 and another adjacent pair of idler sprockets 108. As shown in FIG. 2 the longitudinal shelf 96 has an end portion 110 which is bent to incline upward to bring the upper runs of the auxiliary chains 95 to a level for cooperation with the approaching drive sprockets 72.

Since, as heretofore explained, the spacing of the pairs of drive sprockets 72 of a receptacle 24 from the longitudinal center line of the receptacle is variable in accord with the sizes of fruit for which the spool-shaped rollers 38 are assembled, it is accordingly necessary that the pair of auxiliary sprocket chains 95 be adjustable in their spacing to follow the adjustments of the positions of the drive sprockets 72. For this purpose the various pairs of sprockets 100, 105, 106, and 108 are adjustable with respect to their spacing on their respective shafts.

FIG. 8 shows how the pair of idler sprockets 105 may be mounted on a common shaft 112 in a manner that permits changes in the spacing of the two sprockets. The shaft 112 is journalled in a bearing 114 that is supported by a suitable bracket 115 and the hubs 116 of the two sprockets 105 are provided with suitable set screws 118. The shaft 112 is formed with a pair of peripheral sockets 120 for engagement selectively by one set screw 118 and a similar pair of peripheral sockets 120 for engagement selectively by the other set screw. This arrangement permits the two sprockets 105 to be positioned at maximum spacing when the spool-shaped rollers 38 of the receptacles are at maximum spacing and to be positioned at minimum spacing when the spool-shaped rollers are at minimum spacing. FIG. 8 shows the sprockets 105 at minimum spacing.

In the initial practice of the invention two sets of receptacles 24 are employed interchangeably, one set being assembled to handle relatively large fruit and the other set being assembled to handle relatively small fruit. As heretofore explained, it is a simple matter to change over from one set of the receptacles to the other set for a changeover from a run of fruit of one size to a run of fruit of another size and it is also a simple matter to change the spacing of the auxiliary sprocket chains 95 in accord with changes in positions of the drive sprocket 72 of the receptacles.

The description herein of the presently preferred practice of the invention will suggest various changes, substitutions, and other departures from the disclosure within the spirit and scope of the appended claims.

We claim:

1. In a system for moving successive ellipsoidal objects such as citrus fruit in a given direction of travel with the major axes of the objects at a selected orientation relative to the direction of travel,
the combination of:
a receptacle to carry an individual ellipsoidal object;
means to move the receptacle in the given direction;
a plurality of rollers on the receptacle arranged on laterally spaced parallel axes extending in the direction of receptacle movement to support the ellipsoidal object at four spaced points with said parallel axes at said selected orientation relative to the given direction of travel; and
means on opposite sides of said receptacle responsive to the movement of the receptacle in the given direction to separately rotate the rollers on said respective axes to spin the ellipsoidal object to cause the major axis of the ellipsoidal object to seek said selected orientation.

2. A combination as set forth in claim 1, in which the rollers comprises four rollers to support the fruit at said four points respectively, two pairs of the rollers being arranged on two parallel axes respectively.

3. A combination as set forth in claim 2 in which the two rollers on each of the parallel axes are combined to form a spool-shaped roller.

4. A combination as set forth in claim 1 in which the means to actuate the rollers includes elongated means separate from the receptacle and extending below the receptacle along the path of travel thereof;

and rotary means on the receptacle for rolling engagement with the elongated means, said rotary means being operatively connected to said rollers.

5. A combination as set forth in claim 4 in which said rotary means is sprocket means and said elongated means is sprocket chain means.

6. A combination as set forth in claim 4 which includes means to actuate said elongated means longitudinally whereby the rate of rotation of the rollers depends both on the rate of travel of the receptacle and the rate of actuation of the elongated means.

7. A combination as set forth in claim 1 in which the receptacle includes surrounding wall means to confine the object to the region of the rollers.

8. A combination as set forth in claim 1 in which the receptacle includes a bowl to confine the object and said rollers serve as the bottom of the bowl.

9. In a system for moving successive ellipsoidal objects such as citrus fruit in a given direction of travel with the major axes of the objects at a selected orientation relative to the direction of travel, the combination of:

a row of receptacles for the individual objects;

means to move the row of receptacles longitudinally in said given direction;

a plurality of rollers on each receptacle arranged on two parallel axes to cradle an ellipsoidal object at four spaced points whereby rotation of the rollers to spin the ellipsoidal object causes the object to seek said selected orientation with the major axis of the object parallel to the parallel axes of the rollers;

toothed gearing on each receptacle to rotate the rollers simultaneously in a given rotary direction, said gearing including driven gear means operatively connected to the plurality of rollers; and means extending below the receptacles along the path of travel thereof to mechanically drive said gearing to actuate the plurality of rollers in response to the movement of the receptacles in said given direction.

10. A combination as set forth in claim 9, in which the rollers are arranged on two parallel axes in parallel relation to the given direction of travel to cause the major axis of the spinning object to be oriented in the given direction of travel;

and in which said gearing includes drive gear means to drive the driven gear means, said driven gear means being oriented longitudinally of the receptacle, and said means extending along the path of travel of the receptacles being engaged with said drive gear means.

11. A combination as set forth in claim 10 in which said drive gear means comprises sprocket means;

and in which said means extending along the path of travel of the receptacles comprises sprocket chain means positioned to engage the sprocket drive gear means of the receptacles.

12. A combination as set forth in claim 1 in which the sprocket chain means has a leading end portion that converges onto the path of travel of said sprocket drive means so that the successive sprocket drive gear means of the receptacles engages said leading end of the sprocket chain means as they reach the leading end.

13. A combination as set forth in claim 11 in which said sprocket chain means intermediate its ends is free to move laterally to maintain engagement with the sprocket drive means of the receptacles when the receptacles deviate slightly in their travel in said given direction.

14. A combination as set forth in claim 10 in which said drive gear means comprises two driven gears to operate the rollers on the two parallel axes respectively;

in which said drive gear means comprises two drive gears engaging the two driven gears respectively;

and in which the sprocket chain means comprises two sprocket chains cooperative with the two drive gears respectively.

15. A combination as set forth in claim 14 in which the spacing between the two parallel axes of the plurality of rollers is adjustable to accommodate runs of fruit of different sizes;

in which the spacing between the two drive gears is correspondingly adjustable;

and in which the spacing between the two sprocket chains is correspondingly adjustable.

16. A combination as set forth in claim 15 in which the plurality of rollers comprises two parallel spool-like rollers;

and in which the two spool-like rollers are rotatable on eccentrics that are rotatable to vary the spacing between the two spool-like rollers.

17. A combination as set forth in claim 16 in which the eccentrics are rotatable towards each other and away from each other through 180° to position the spool-like rollers at minimum and maximum spacing respectively.

18. A combination as set forth in claim 16 in which the two driven gears are unitary with the two spool-like rollers respectively;

in which the two drive gears mesh with the two driven gears perpendicularly of the two driven gears;

and in which the two drive gears are adjustable axially to follow the changes in positions of the two driven gears.

19. A combination as set forth in claim 9 in which at least the major portions of said receptacles are made of plastic material having the general characteristics of nylon.

20. A combination as set forth in claim 19 in which said gearing comprises gears made of plastic material having the general characteristics of nylon.

21. A combination as set forth in claim 9 in which each of said receptacles is shaped to form a bowl to receive a single ellipsoidal object with the plurality of rollers of the receptacle forming the bottom of the bowl.

22. A combination as set forth in claim 10 in which said plurality of rollers on each receptacle comprises two parallel spool-like rollers;

in which said driven gear means comprises two sprocket gears unitary with the two spool-like rollers respectively coaxially thereof;

in which said drive gear means comprises two drive gear sprockets in mesh with the two driven sprockets respectively and positioned 90° relative thereto in planes of rotation that are parallel with said given direction of travel;

and in which said means extending along the path of travel comprises two parallel sprocket chains.

23. A combination as set forth in claim 22 in which the spacing between the two spool-like rollers is adjustable to accommodate fruit of different sizes;

and in which the two drive sprockets are adjustable axially to cooperate with the two driven sprockets at adjusted positions of the driven sprockets.

24. A combination as set forth in claim 23 in which the spacing of the two sprocket chains is adjustable in accord with the axial adjustments of the drive gear sprockets.

25. A combination as set forth in claim 24 which includes means to drive the two parallel sprocket chains longitudinally independently of the means to move the row of receptacles.

26. A combination as set forth in claim 9 which includes actuating means to drive said means that extends along the path of travel of the receptacles.

27. A combination as set forth in claim 26 in which said actuating means is independent of said means that moves the row of receptacles.

28. A combination as set forth in claim 27 in which said actuating means is adjustable to adjust the rate of longitudinally movement of said means that extends along the path of travel of the receptacles.

29. A combination as set forth in claim 9 in which the receptacles are quickly detachable for individual removal from said row to permit one receptacle to be quickly replaced by another receptacle.

30. A combination as set forth in claim 29 which includes two interchangeable sets of receptacles constructed to handle two different sizes of the ellipsoidal objects.

31. A combination as set forth in claim 29
which includes two endless parallel means at opposite sides of the row of receptacles;

which includes spaced transverse rods connected at their opposite ends to the two endless parallel means respectively;

and in which the receptacles are detachably connected to the transverse rod means.

32. A combination as set forth in claim 31 in which the leading ends of the receptacles are shaped for hook engagement with the transverse rods.

33. A combination as set forth in claim 32 in which the trailing ends of the receptacles are formed with longitudinal slots to slidingly straddle the transverse rods.

34. A combination as set forth in claim 33 in which the two endless parallel means move said receptacles along one run in said given direction and along a return run in the opposite direction with the receptacles upside down on the return run;

and in which the receptacles are releasable from hook engagement with the transverse rods by tilting the leading ends of the receptacles upward when the receptacles are upside down on said return run.

35. A combination as set forth in claim 9 in which the means to move the row of receptacles comprises sprocket chain means; in which the means extending along the path of travel of the receptacles comprises sprocket chain means; and in which the speed of rotation of said roller may be varied in response to changes in the relative velocity of the respective sprocket chain means.

* * * * *

UNITED STATES PATENT OFFICE
CERTIFICATE OF CORRECTION

PATENT NO. : 3,945,489
DATED : March 23, 1976
INVENTOR(S) : Paul F. Paddock and Jerry W. Cramer It is certified that error appears in the above-identified patent and that said Letters Patent are hereby corrected as shown below:

Column 3, line 60, "in" should read --is--;

Column 5, line 27, insert a period (.) after "size";

Column 8, line 5 (Claim 12, line 1), "1" should read --11--;

Column 9, line 33, "longitudinally" should read --longitudinal-

Signed and Sealed this fifteenth Day of June 1976

[SEAL]

Attest:

RUTH C. MASON
*Attesting Officer*

C. MARSHALL DANN
*Commissioner of Patents and Trademarks*